US012786675B2

(12) United States Patent
Agnew

(10) Patent No.: US 12,786,675 B2
(45) Date of Patent: Nov. 3, 2026

(54) SYSTEMS AND METHODS FOR PROVIDING ZONE-BASED AVAILABILITY FOR PLAYING MEDIA IN A VEHICLE

(71) Applicants: Hyundai Motor Company, Seoul (KR); Kia Corporation, Seoul (KR)

(72) Inventor: Scott Agnew, Superior Township, MI (US)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 293 days.

(21) Appl. No.: 18/768,951

(22) Filed: Jul. 10, 2024

(65) Prior Publication Data

US 2026/0019785 A1 Jan. 15, 2026

(51) Int. Cl.

| | |
|---|---|
| ***H04W 4/48*** | (2018.01) |
| ***G06F 3/14*** | (2006.01) |
| ***G06F 3/16*** | (2006.01) |
| ***H04W 48/04*** | (2009.01) |

(52) U.S. Cl.

CPC ............. *H04W 4/48* (2018.02); *H04W 48/04* (2013.01); *G06F 3/1423* (2013.01); *G06F 3/165* (2013.01)

(58) Field of Classification Search

CPC ....... H04W 4/48; H04W 48/04; G06F 3/1423; G06F 3/165

See application file for complete search history.

(56) References Cited

U.S. PATENT DOCUMENTS

| | | | | |
|---|---|---|---|---|
| 10,560,795 | B1 | 2/2020 | Kim | |
| 11,917,094 | B2 * | 2/2024 | Oman | B60K 35/10 |
| 12,228,632 | B2 * | 2/2025 | Zhang | G01S 13/04 |
| 12,537,915 | B2 * | 1/2026 | Hanson | G06V 10/25 |
| 12,656,861 | B2 * | 6/2026 | Kim | B60K 35/81 |
| 2015/0066247 | A1 * | 3/2015 | Dale | B60W 50/00 701/2 |
| 2016/0182548 | A1 * | 6/2016 | Ghabra | H04W 24/10 726/23 |
| 2018/0099643 | A1 * | 4/2018 | Golsch | B60R 25/24 |
| 2020/0223328 | A1 * | 7/2020 | Kobayashi | B60K 35/10 |
| 2021/0038055 | A1 | 2/2021 | Donhowe et al. | |

(Continued)

FOREIGN PATENT DOCUMENTS

KR 10-2174168 B1 11/2020

*Primary Examiner* — Lewis G West

(74) *Attorney, Agent, or Firm* — Fox Rothschild LLP

(57) ABSTRACT

Systems and methods for providing zone-based availability for playing media are provided. The system may comprise a vehicle comprising a cabin, an ultra-wideband receiver, a plurality of non-ultra-wideband receivers, a plurality of media playing devices, and a computing device comprises a processor and a memory configured to store instructions that, when executed by the processor, are configured to cause the processor to establish one or more zones within the vehicle, establish an ultra-wideband connection between one or more electronic devices and the ultra-wideband receiver, determine a location of each of the one or more electronic devices, assign a zone for each electronic device based on the location of each of the one or more electronic devices, and establish a connection between each electronic device and the one or more non-ultra-wideband receivers located within its assigned zone, enabling the electronic device to play media within its assigned zone.

20 Claims, 10 Drawing Sheets

(56) References Cited

U.S. PATENT DOCUMENTS

| | | | | |
|---|---|---|---|---|
| 2021/0271909 | A1* | 9/2021 | Spell | B60K 35/10 |
| 2022/0030392 | A1* | 1/2022 | Hasegawa | H04W 64/00 |
| 2022/0032920 | A1* | 2/2022 | Varughese | H04W 4/40 |
| 2022/0182819 | A1* | 6/2022 | Yae | H04W 12/06 |
| 2023/0073436 | A1* | 3/2023 | Kent | B60R 25/245 |
| 2023/0099551 | A1* | 3/2023 | Gupta | B60W 50/12 701/36 |
| 2023/0194663 | A1* | 6/2023 | Zhang | G01S 7/41 701/49 |
| 2023/0234538 | A1* | 7/2023 | Golsch | B60R 25/24 340/5.61 |
| 2023/0306806 | A1* | 9/2023 | Van Wiemeersch | E05F 15/73 |
| 2023/0334921 | A1* | 10/2023 | Cheikh | B60R 25/209 |
| 2024/0292167 | A1* | 8/2024 | Nesfield | H04R 27/00 |
| 2024/0375511 | A1* | 11/2024 | Bove, Jr. | B60K 35/00 |
| 2024/0396972 | A1* | 11/2024 | Shi | G01S 13/86 |
| 2025/0119745 | A1* | 4/2025 | DeVito | H04W 8/005 |
| 2025/0294321 | A1* | 9/2025 | Sun | H04W 4/029 |
| 2025/0324195 | A1* | 10/2025 | Hong | G06F 3/165 |

* cited by examiner

SYSTEMS AND METHODS FOR PROVIDING ZONE-BASED AVAILABILITY FOR PLAYING MEDIA IN A VEHICLE

BACKGROUND

Technical Field

Embodiments of the present disclosure relate to systems and methods for providing zone-based availability for playing media in a vehicle.

Background

Vehicles often comprise systems for playing media. A vehicle passenger may have a media library for use while in the vehicle. The media library may comprise music, videos, games, audio vehicle elements (e.g., specific sound effects for vehicle actions, simulated engine noise for battery electric vehicles (BEVs), voice assistants, etc.), visual vehicle elements (e.g., accent colors or patterns, etc.), and/or other suitable media.

There are situations where a passenger(s) may wish to enjoy their media library in a controlled or private manner. For example, while in a taxi, bus, or ride share vehicle, the passenger may wish to enjoy music privately without needing to wear headphones or earbuds. By way of another example, a driver may enjoy one simulated engine noise for their BEV while their passenger would enjoy a different simulated engine noise or no simulated engine noise. By way of another example, a driver may use an English GPS navigation voice, while their passenger may prefer to hear a GPS navigation voice in a different language or hear no GPS navigation voice.

Conversely, there may be situations where one or more vehicle passengers may wish to share their media library with others or apply their media to specific parts of the cabin. For example, the rear right and rear left passenger may wish to enjoy a movie without headphones, but they do not want to disturb a baby sleeping in the rear center seat.

For at least these reasons, systems and methods for providing zone-based availability for playing media in a vehicle are needed.

SUMMARY

According to an object of the present disclosure, a system for providing zone-based availability for playing media is provided. The system may comprise a vehicle comprising a cabin, an ultra-wideband receiver, a plurality of non-ultra-wideband receivers, a plurality of media playing devices, and a computing device. The computing device may comprise a processor and a memory. The memory may be configured to store instructions that, when executed by the processor, are configured to cause the processor to establish one or more zones within the cabin of the vehicle. Each of the one or more zones may have a position and size correlating to coordinates within the cabin of the vehicle. Each of the one or more zones may have one or more media playing devices and one or more non-ultra-wideband receivers located therewithin and associated with a specific zone. The instructions, when executed by the processor, may be configured to establish an ultra-wideband connection between one or more electronic devices and the ultra-wideband receiver, determine, using the ultra-wideband receiver, a location of each of the one or more electronic devices, assign a zone for each of the one or more electronic devices based on the location of each of the one or more electronic devices, and establish a connection between each electronic device, of the one or more electronic devices, and the one or more non-ultra-wideband receivers located within its assigned zone, enabling the electronic device, via the one or more non-ultra-wideband receivers, to play media through the one or more media playing devices within its assigned zone.

According to an exemplary embodiment, the establishing the one or more zones within the cabin of the vehicle may comprise determining a vehicle occupancy of the vehicle, comprising determining a number of passengers within the vehicle and determining a location of each passenger within the vehicle. According to an exemplary embodiment, the establishing the one or more zones within the cabin of the vehicle may comprise establishing, based on the vehicle occupancy, a number of zones, a shape of each zone, a size of each zone, and a position of each zone.

According to an exemplary embodiment, the plurality of non-ultra-wideband receivers may comprise a plurality of Bluetooth® receivers.

According to an exemplary embodiment, the computing device may further comprise a graphical user interface. According to an exemplary embodiment, the instructions, when executed by the processor, may be further configured to cause the processor to receive a selection, by a user, to share media within an electronic device associated with a zone, with one or more zones not associated with the electronic device.

According to an exemplary embodiment, the instructions, when executed by the processor, may be further configured to cause the processor to play the shared media on the one or more media playing devices of the one or more zones not associated with the electronic device.

According to an exemplary embodiment, the instructions, when executed by the processor, may be further configured to cause the processor to play the shared media on the one or more media playing devices of the one or more zones not associated with the electronic device and the one or more media playing devices of the zone associated with the electronic device.

According to an exemplary embodiment, the media may comprise one or more of: audio media; visual media; and audio-visual media.

According to an exemplary embodiment, the one or more media playing devices may comprise one or more of: one or more speakers; and one or more displays.

According to an exemplary embodiment, the determining the location of each of the one or more electronic devices may comprise incorporating time distance of arrival and/or two-way ranging techniques.

According to an exemplary embodiment, a number of zones, of the one or more zones, may correlate to a number of seats within the cabin of the vehicle.

According to an object of the present disclosure, a method for providing zone-based availability for playing media is provided. The method may comprise establishing, using a computing device, one or more zones within a cabin of a vehicle. The computing device may comprise a processor and a memory. Each of the one or more zones may have a position and size correlating to coordinates within the cabin of the vehicle. Each of the one or more zones may have one or more media playing devices and one or more non-ultra-wideband receivers located therewithin and associated with a specific zone. The method may comprise establishing an ultra-wideband connection between one or more electronic devices and an ultra-wideband receiver, determining, using the ultra-wideband receiver, a location of each of the one or more electronic devices, assigning a zone for each of the one or more electronic devices based on the location of each of the one or more electronic devices, and establishing a connection between each electronic device, of the one or more electronic devices, and the one or more non-ultra-wideband receivers located within its assigned zone, enabling the electronic device, via the one or more non-ultra-wideband receivers, to play media through the one or more media playing devices within its assigned zone.

According to an exemplary embodiment, the establishing the one or more zones within the cabin of the vehicle may comprise determining a vehicle occupancy of the vehicle, comprising determining a number of passengers within the vehicle and determining a location of each passenger within the vehicle. According to an exemplary embodiment, the establishing the one or more zones within the cabin of the vehicle may comprise establishing, based on the vehicle occupancy, a number of zones, a shape of each zone, a size of each zone, and a position of each zone.

According to an exemplary embodiment, the one or more of non-ultra-wideband receivers may comprise a plurality of Bluetooth® receivers.

According to an exemplary embodiment, the computing device may further comprises a graphical user interface. According to an exemplary embodiment, the method may further comprise receiving a selection, by a user, to share media within an electronic device associated with a zone, with one or more zones not associated with the electronic device.

According to an exemplary embodiment, the method may further comprise playing the shared media on the one or more media playing devices of the one or more zones not associated with the electronic device.

According to an exemplary embodiment, the method may further comprise playing the shared media on the one or more media playing devices of the one or more zones not associated with the electronic device and the one or more media playing devices of the zone associated with the electronic device.

According to an exemplary embodiment, the media may comprise one or more of: audio media; visual media; and audio-visual media.

According to an exemplary embodiment, the one or more media playing devices may comprise one or more of: one or more speakers; and one or more displays.

According to an exemplary embodiment, the determining the location of each of the one or more electronic devices may comprise incorporating time distance of arrival and/or two-way ranging techniques.

According to an exemplary embodiment, a number of zones, of the one or more zones, may correlate to a number of seats within the cabin of the vehicle.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
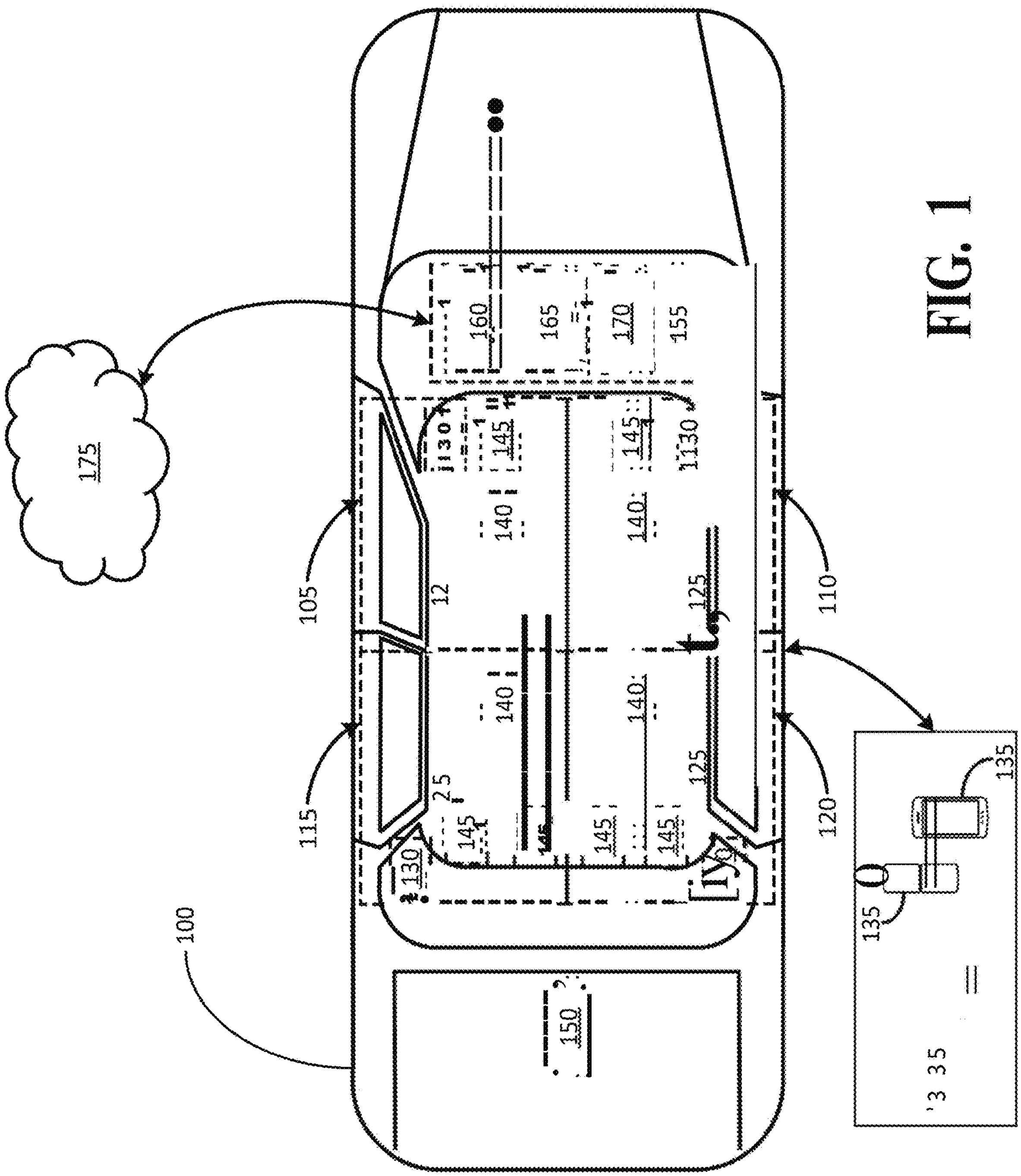
FIG. 1 illustrates a vehicle configured for providing zone-based availability for playing media, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating." "generating," "aligning,"

"synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package." an Integrated Circuit (IC).

According to exemplary embodiments, systems and methods for providing zone-based availability for playing media are provided.

Referring now to FIG. 1, a vehicle 100 configured for providing zone-based availability for playing media is illustratively depicted, in accordance with an exemplary embodiment of the present disclosure. According to an exemplary embodiment, the vehicle 100 may comprise an electric vehicle and/or other suitable vehicle. It is noted that, while the vehicle 100 is illustrated as an automobile, the vehicle may comprise other vehicles such as, e.g., buses, trains, planes, boats, and/or other suitable vehicles.

According to an exemplary embodiment, the vehicle 100 may be divided into one or more zones (e.g., zone 105, zone 110, zone 115, and zone 120). According to an exemplary embodiment, the vehicle 100 may comprise one zone for each seat 125 in the vehicle 100.

According to an exemplary embodiment, each zone may comprise a non-ultra-wideband receiver 130 (e.g., a Bluetooth® receiver and/or other suitable type of non-ultra-wideband receiver) configured to receive a signal from one or more electronic devices 135 (e.g., one or more smart phones, cell phones, laptop computers, tablet computers, gaming consoles, media players, and/or other suitable electronic devices). As shown in FIG. 1, the vehicle 100 may comprise four non-ultra-wideband receivers 130 (e.g., one non-ultra-wideband receiver 130 for each zone). It is noted, however, that the vehicle 100 may be configured to comprise greater or fewer non-ultra-wideband receivers 130 while maintaining the spirit and functionality of the present disclosure.

According to an exemplary embodiment, the vehicle 100 may comprise one or more media playing devices 145 (e.g., one or more speakers, displays, and/or other suitable media playing devices). According to an exemplary embodiment, the vehicle 100 may comprise one or more media playing devices 145 for each of zone. The one or more media playing devices 145 may be each configured to connect to one or more electronic devices 135 via the one or more non-ultra-wideband receivers 130. According to an exemplary embodiment, the one or more media playing devices 145 may comprise a plurality of speakers that are configured to pair to a single electronic device 135.

According to an exemplary embodiment, the vehicle 100 may comprise an ultra-wideband receiver 150. According to an exemplary embodiment, the ultra-wideband receiver 150 may be configured to enable high-precision location detection of the one or more electronic devices 135 (via, e.g., time distance of arrival techniques, two-way ranging techniques, and/or other suitable techniques/methods for high-precision location detection). According to an exemplary embodiment, the ultra-wideband receiver 150 may be configured to determine an approximate location of an electronic device 135 (that has established a connection) within the vehicle 100. Using this, or similar technology, an electronic device's 135 availability can be restricted to one or more certain physical sections (e.g., zones 105, 110, 115, 120) of the vehicle 100 cabin. According to an exemplary embodiment, the vehicle 100 may be configured such that the owner/operator of a media may be enabled to share access to the media to one or more zones. The media may comprise audio media, visual media, audio-visual media, and/or other suitable media.

For example, there may be three passengers within the vehicle 100. Each of the passengers may have a cell phone 135 containing media. The three passengers may be a driver (in zone 105), a front right passenger (in zone 110), and a rear left passenger (in zone 115). The vehicle 100 may establish wireless communication with each cell phone of the three passengers, track the approximate location of each cell phone, and assigned a zone to each cell phone based on location (e.g., assigning the driver's cell phone to zone 105, assigning the front right passenger's cell phone to zone 110, and assigning the rear left passenger's cell phone to zone 115). As each passenger uses their media from their cell phone, the media will only be played in the cell phone's corresponding zone. According to an exemplary embodiment, each passenger may, optionally, share access to the media with one or more other zones.

According to an exemplary embodiment, the vehicle 100 may comprise one or more passenger sensors 140 configured to determine whether a passenger is present within the vehicle. According to an exemplary embodiment, the one or more passenger sensors 140 may comprise one or more seatbelt engagement sensors configured to determine whether a seatbelt is engaged for each seat 125, one or more pressure sensors, motion sensors, and/or microphones configured to determined whether a passenger is present in each seat 125, and/or other suitable sensors for determining whether a passenger is present within the vehicle 100.

According to an exemplary embodiment, the vehicle 100 may comprise one or more computing devices 155. The one or more computing devices 155 may be separate from the one or more receivers 130, one or more media playing devices 145, and/or the ultra-wideband receiver 150 and/or may be incorporated into and/or coupled to the one or more receivers 130, one or more media playing devices 145, and/or the ultra-wideband receiver 150.

According to an exemplary embodiment, the computing device 155 may comprise a processor 160, a memory 165, and/or a user interface 170 (e.g., a graphical user interface). The computing device 155 may be configured to send and/or receive commands/data/etc. via one or more external systems via wired and/or wireless connection (e.g., via the cloud 175). The memory 165 may be configured to store programming instructions that, when executed by the processor 160, may be configured to cause the processor 160 to perform one or more tasks such as, e.g., establishing communication with one or more electronic devices 135, determining a location (e.g., zone) of each electronic device 135 that has established communication, playing media from one or more of the electronic devices 135 in one or more of the zones, and/or performing one or more other suitable tasks.

Referring now to FIGS. 2A-2E, flowchart of a method 200 for providing zone-based availability for playing media in a vehicle is illustratively depicted, in accordance with an exemplary embodiment of the present disclosure.

At 202, zone formation is established. According to an exemplary embodiment, space in the vehicle's cabin may be divided into a number of zones (e.g., zones 105, 110, 115, 120 of FIG. 1, zones 305, 310, 315, 320, 325 of FIGS. 3A-3P, and/or other suitable zones). According to an exemplary embodiment, when a zone is established, the zone will have a position and size within the vehicle correlating to x, y, and/or z coordinates within the cabin of the vehicle.

According to an exemplary embodiment, the number of zones may correlate to the number of seats (e.g., zones 105, 110, 115, 120 of FIG. 1 correlating to each of the four seats) and establishing zone formation comprises generating a zone for each of the seats, with the position, size, and shape of the zones may correlate.

According to an exemplary embodiment, the number of zones may correlate to the number of passengers in the vehicle (as shown and described, in more detail, in FIG. 2B), with the position, size, and shape of the zones correlated to the number of seats and the location of the seats within the vehicle, as shown, e.g., in FIG. 1.

Figure 2A:
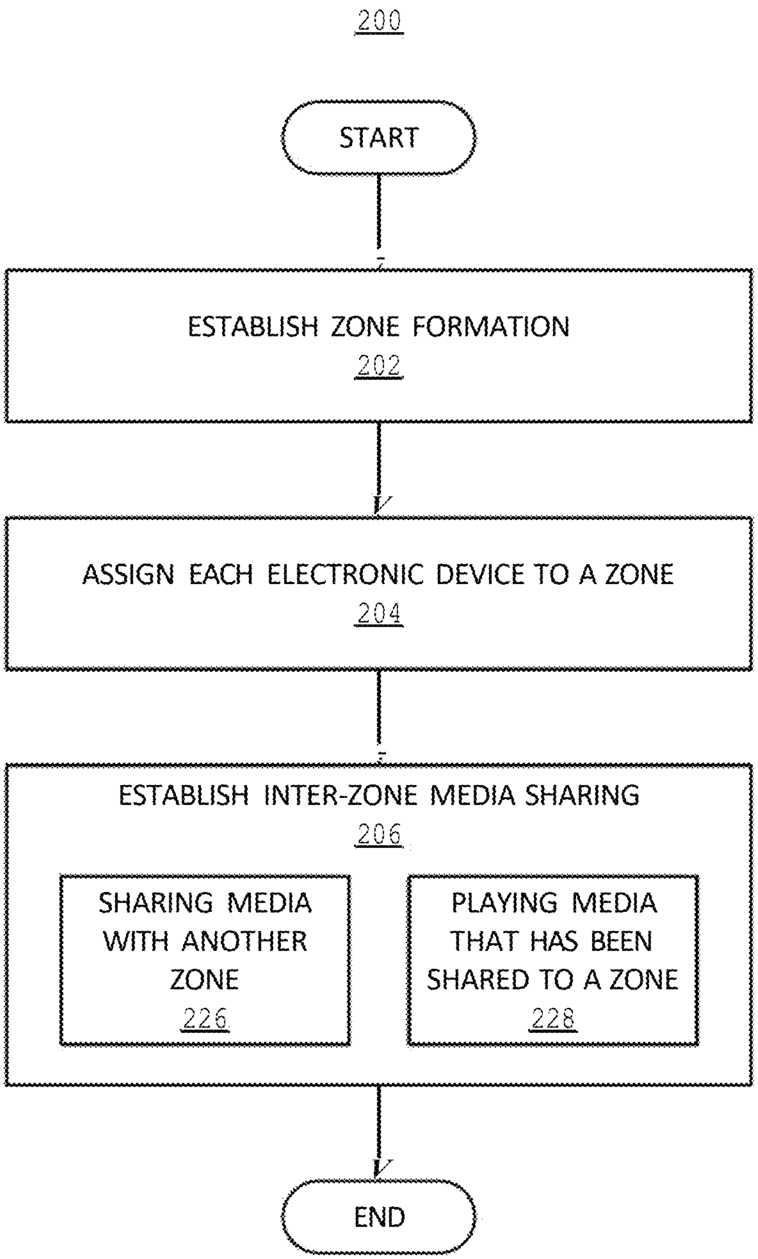
FIGS. 2A-2E illustrate a flowchart of a method for providing zone-based availability for playing media in a vehicle, according to an exemplary embodiment of the present disclosure.
Figure 2B:
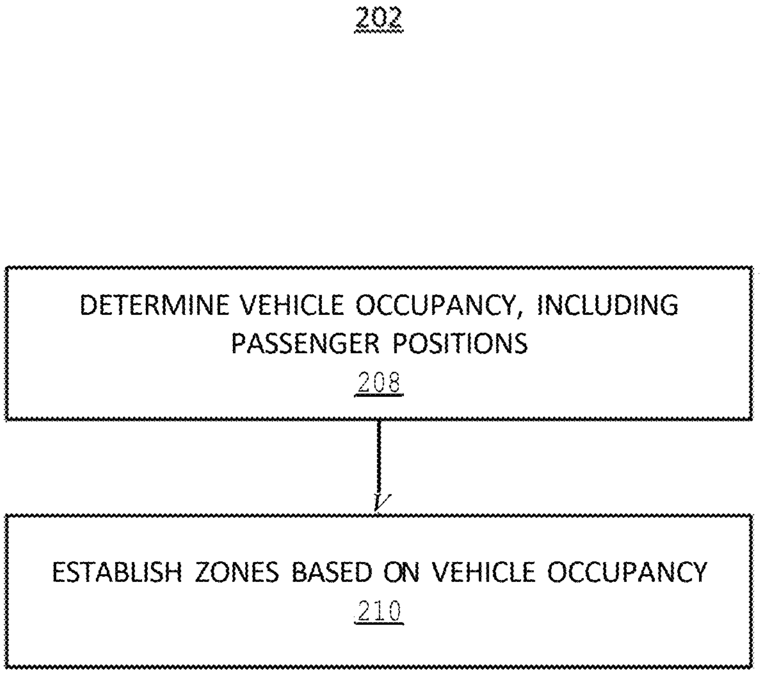
Figure 2C:
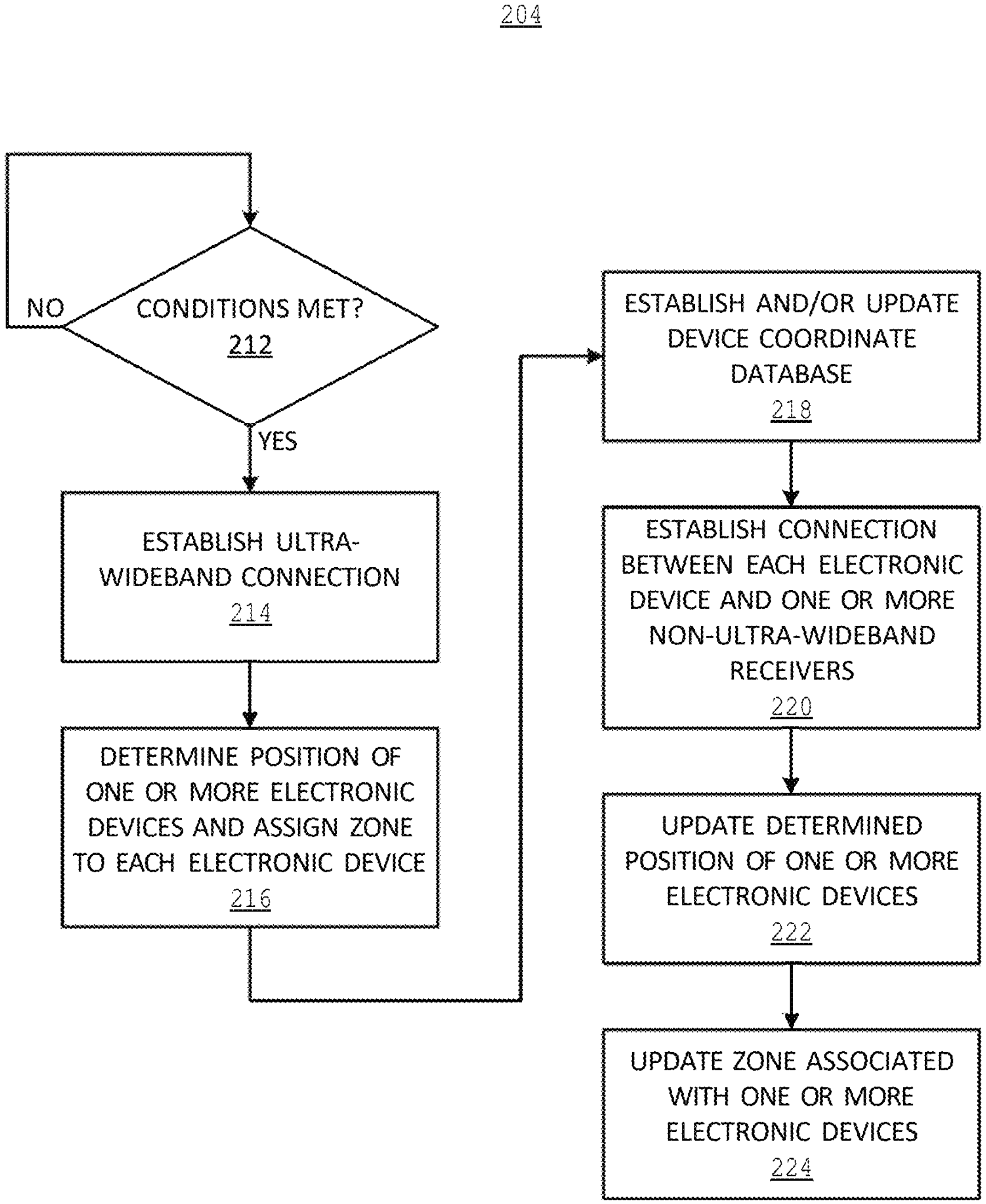
Figure 2D:
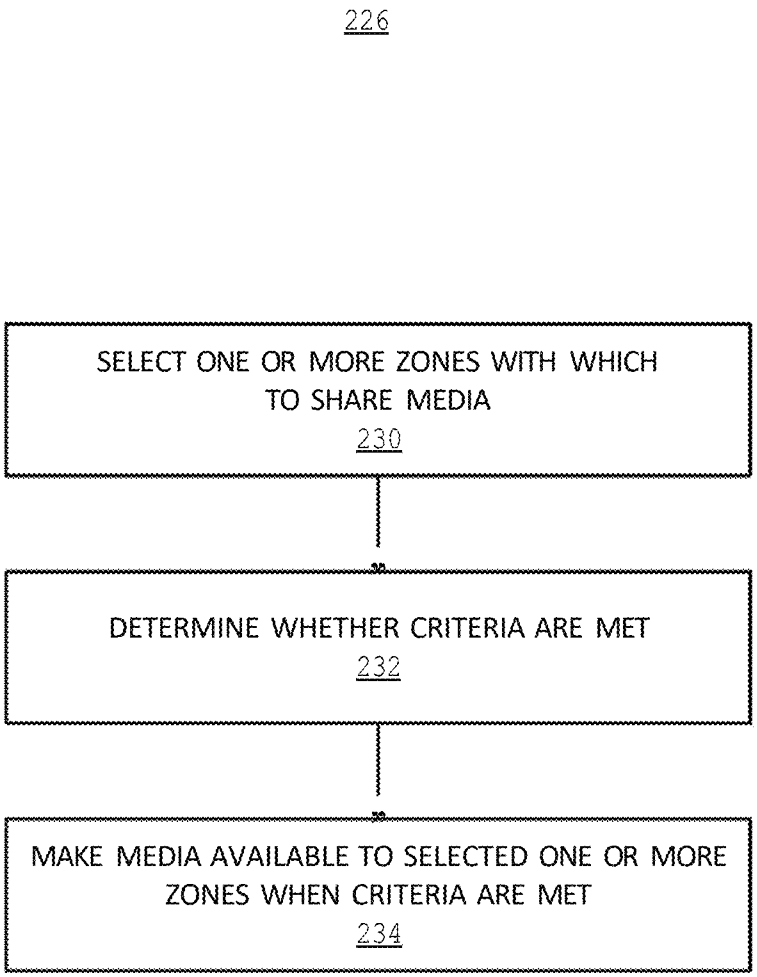
Figure 2E:
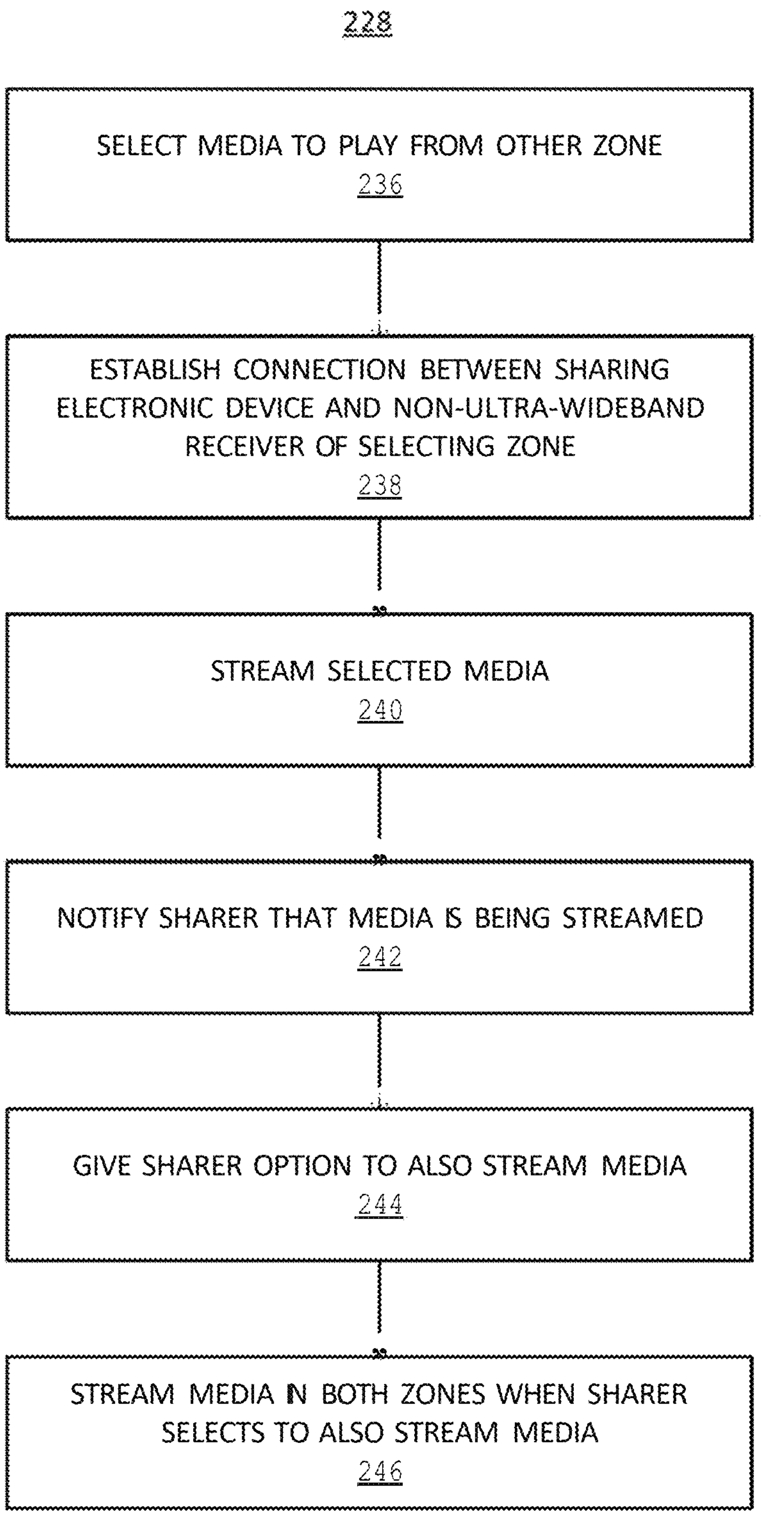

As shown in FIG. 2B, when the number of zones correlates to the number of passengers in the vehicle, establishing zone formation may comprise, at 208, determining vehicle occupancy. Determining vehicle occupancy may comprise determining whether a passenger is present in each seat using one or more passenger sensors. Determining whether a passenger is present in each seat may comprise determining whether a seatbelt is engaged for each seat, whether a passenger is present in each seat, and/or other suitable mean for determining vehicle occupancy. According to an exemplary embodiment, determining vehicle occupancy may comprise determining a location of each passenger within the vehicle.

Figure 3A:
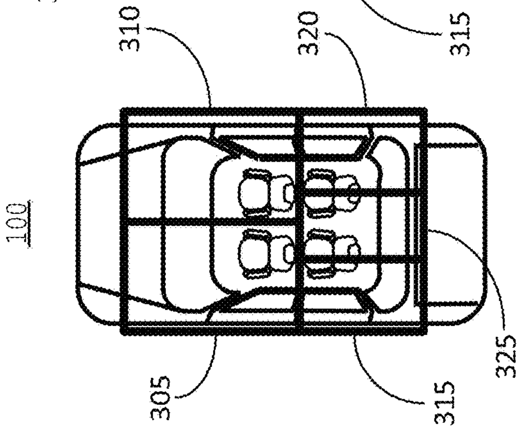
FIGS. 3A-3P illustrate zone configurations within a vehicle, according to exemplary embodiments of the present disclosure.
Figure 3B:
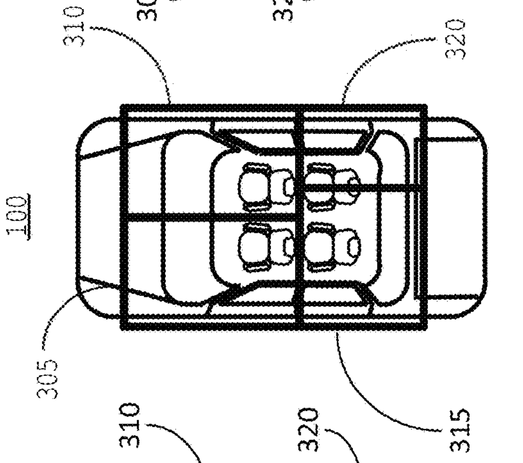
Figure 3C:
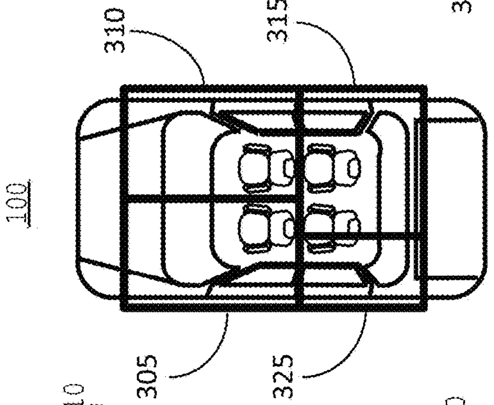
Figure 3D:
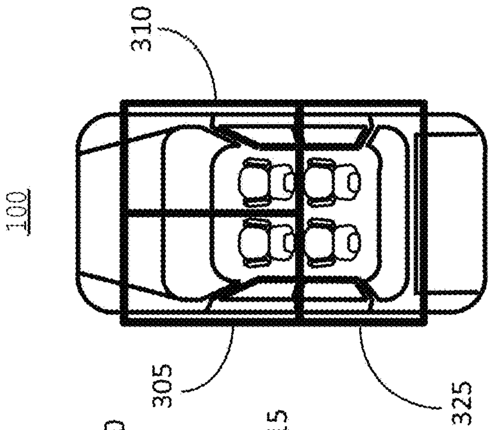
Figure 3E:
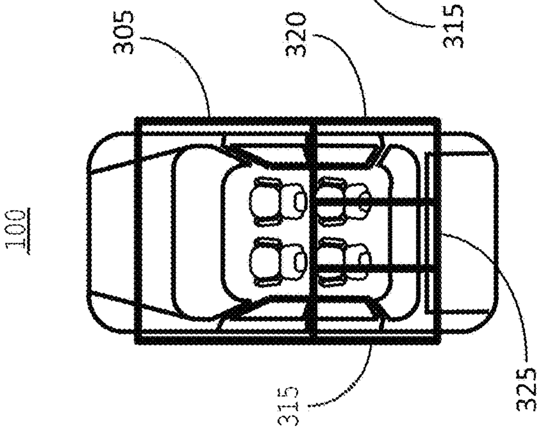
Figure 3F:
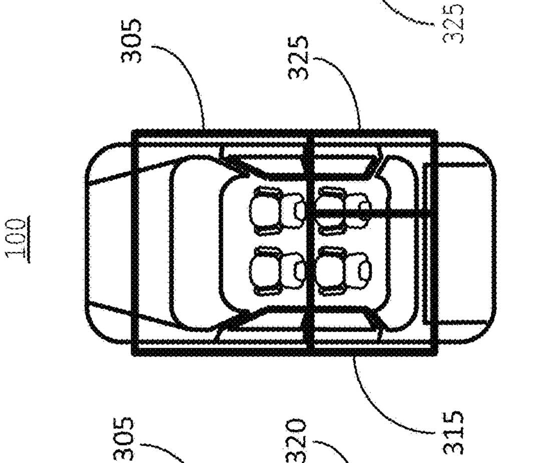
Figure 3G:
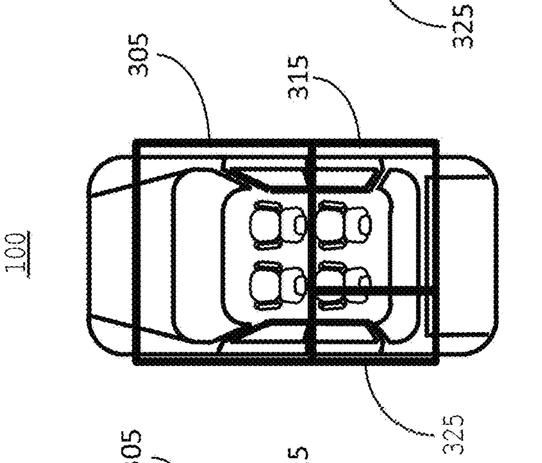
Figure 3H:
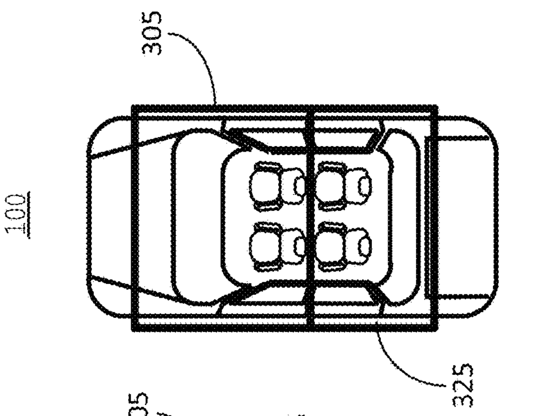
Figure 3L:
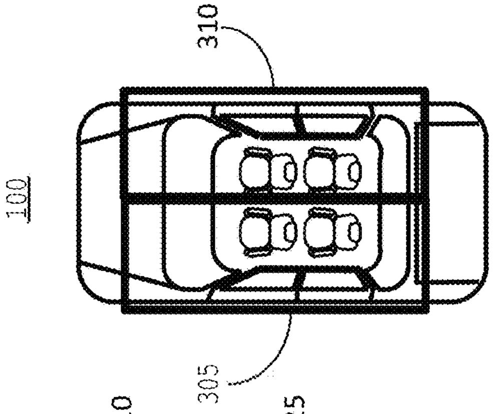
Figure 3K:
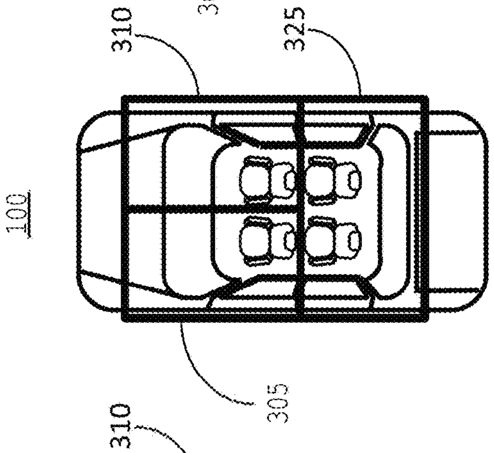
Figure 3J:
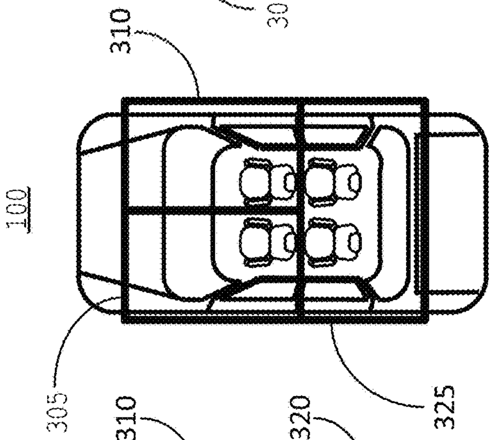
Figure 3I:
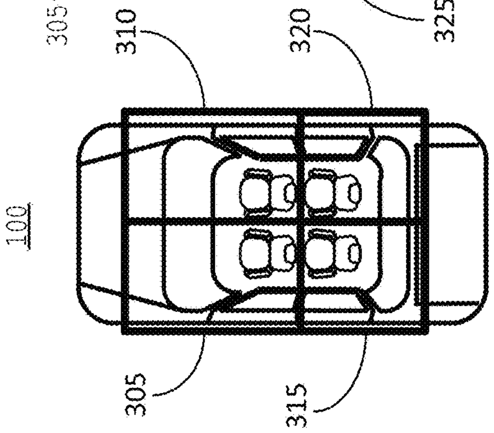
Figure 3P:
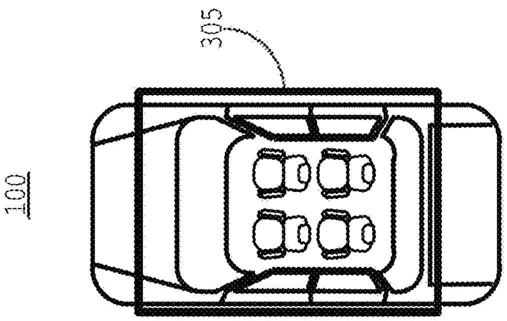

As shown in FIGS. 3A-3P, the vehicle may comprise a driver seat, a front right seat, a rear left seat, a rear right seat, and a rear center seat. It is noted, however, that other positions of each seat and/or other numbers of seats may be incorporated while maintaining the spirit and functionality of the present disclosure.

At 210, one or more zones, including zone quantity (e.g., a number of zones), shape, size, and position, may be established based on the vehicle occupancy. For example, as shown in FIGS. 3A-3P:

When a passenger is present in the driver seat, the front right seat, the rear right seat, the rear left seat, and the rear center seat, the zones of the vehicle may be divided according to FIG. 3A.

When a passenger is present in the driver seat, front right seat, the rear right seat, and the rear left seat, but not present in the rear center seat, the zones of the vehicle may be divided according to FIG. 3I.

When a passenger is present in the driver seat, the front right seat, the rear right seat, and the rear center seat, but not in the rear left seat, the zones of the vehicle may be divided according to FIG. 3B.

When a passenger is present in the driver seat, the front right seat, and the rear right seat, but not in the rear left seat or the rear center seat, the zones of the vehicle may be divided according to FIG. 3J.

When a passenger is present in the driver seat, the front right seat, the rear left seat, and the rear center seat, but not in the rear right seat, the zones of the vehicle may be divided according to FIG. 3C.

When a passenger is present in the driver seat, the front right seat, and the rear left seat, but not the rear right seat or the rear center seat, the zones of the vehicle may be divided according to FIG. 3K.

When a passenger is present in the driver seat, the front right seat, and the rear center seat, but not the rear right seat or the rear left seat, the zones of the vehicle may be divided according to FIG. 3D.

When a passenger is present in the driver seat and the front right seat, but not in the rear right seat, the rear left seat, or the rear center seat, the zones of the vehicle may be divided according to FIG. 3L.

When a passenger is present in the driver seat, the rear right seat, the rear left seat, and the rear center seat, but not the front right seat, the zones of the vehicle may be divided according to FIG. 3E.

Figure 3O:
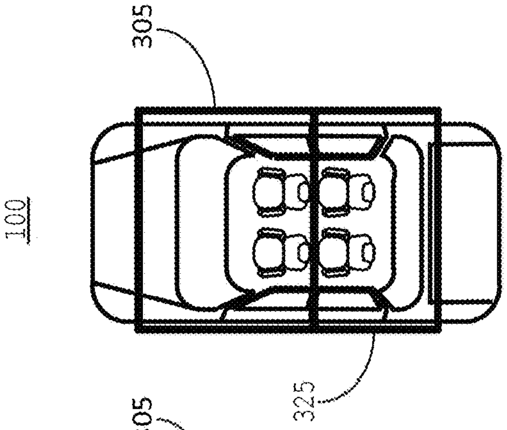
Figure 3N:
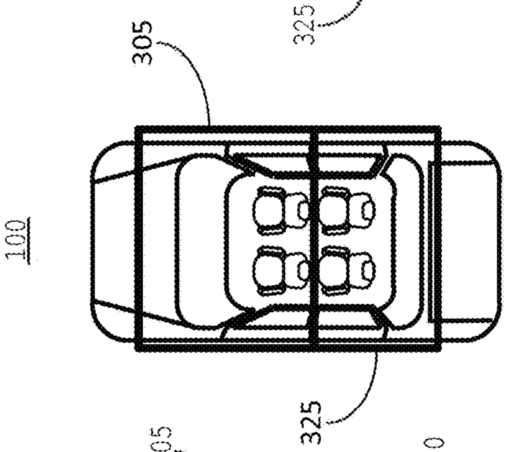
Figure 3M:
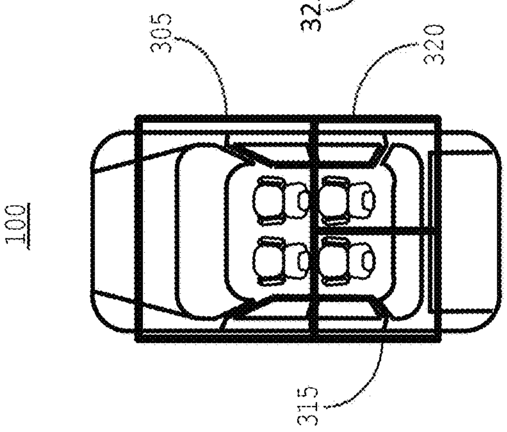

When a passenger is present in the driver seat, the rear right seat, and the rear left seat, but not the front right seat or the rear center seat, the zones of the vehicle may be divided according to FIG. 3M.

When a passenger is present in the driver seat, the rear right seat, and the rear center seat, but not the front right seat or the rear left seat, the zones of the vehicle may be divided according to FIG. 3F.

When a passenger is present in the driver seat and the rear right seat, but not the front right seat, the rear left seat, or the rear center seat, the zones of the vehicle may be divided according to FIG. 3N.

When a passenger is present in the driver seat, the rear left seat, and the rear center seat, but not the front right seat or the rear right seat, the zones of the vehicle may be divided according to FIG. 3G.

When a passenger is present in the driver seat and the rear left seat, but not the front right seat, the rear right seat, of the rear center seat, the zones of the vehicle may be divided according to FIG. 3O.

When a passenger is present in the driver seat and the rear center seat, but not the front right seat, the rear right seat, or the rear left seat, the zones of the vehicle may be divided according to FIG. 3F.

When a passenger is present in the driver seat, but not the front right seat, the rear right seat, the rear left seat, or the rear center seat, the zones of the vehicle may be divided according to FIG. 3P.

It is noted, however, that other zone divisions may be incorporated, while maintaining the spirit and functionality of the present disclosure.

At 204, each electronic device may be assigned to a zone. This is shown, in more detail, in FIG. 2C.

At 212, it may be determined whether one or more conditions have been met for one or more electronic devices to be assigned to a zone. The one or more conditions may comprise whether the vehicle has been parked for a set length of time, whether the vehicle is shifted into drive, and/or other suitable conditions.

At 214, when the one or more conditions have been met, an ultra-wideband connection may be established with each of the one or more electronic devices and, at 216, the position (e.g., the x, y, and/or z coordinates) of each electronic device within the vehicle may be determined and a zone may be assigned for each electronic device based on the location/position of the electronic device within the cabin of the vehicle. The position may be determined via time difference of arrival technology, two-way ranging technology, and/or other suitable technologies.

At 218, a device coordinate database may be established and/or updated. The device coordinate database may list the coordinates of each electronic device as well as a single zone for each device in which the coordinates for each device are located. According to an exemplary embodiment, zone access for each electronic device may be stored within the device coordinate database. According to an exemplary embodiment, the device coordinate database may be stored within the one or more computing devices of the vehicle and/or remotely from the vehicle.

At 220, a connection (e.g., a Bluetooth® or other suitable connection) may be established between each electronic device and the one or more non-ultra-wideband receivers that correspond to a zone of the electronic device. According to an exemplary embodiment, making the connection between an electronic device the one or more non-ultra-wideband receivers that correspond to the zone of the electronic device may comprise enabling one or more media playing devices within the zone to play media from the electronic device associated with the zone. According to an exemplary embodiment, controlling the media for a zone may be done from a device physically within the zone (such as, e.g., through an application), from a piece of hardware built into the vehicle (such as, e.g., a graphical user interface), and/or other suitable methods.

At 222, the determined position of the one or more electronic devices may be updated (via time difference of arrival technology, two-way ranging technology, and/or other suitable technologies). According to an exemplary embodiment, the position of the one or more electronic devices may be manually and/or automatically rechecked. According to an exemplary embodiment, the position of the one or more electronic devices may be automatically rechecked periodically in set time intervals.

According to an exemplary embodiment, when the updated position of an electronic device is within a different zone, then, at 224, the zone associated with the electronic device may be updated.

According to an exemplary embodiment, the vehicle may be configured such that one or more users may share the media from one electronic device to one or more other zones. Therefore, the media available to each zone may be the sum of all media of every electronic device physically within the zone and all media shared to the zone from electronic devices not physically within the zone. At 206, inter-zone media sharing may be established.

According to an exemplary embodiment, establishing inter-zone media sharing may comprise, at 226, sharing media with another zone, as shown, e.g., in FIG. 3D.

At 230, a user may select one or more zones with which to share media. According to an exemplary embodiment, the user may be enabled to select the one or more zones with which to share the media via a graphical user interface. The graphical user interface may be coupled to the one or more computing devices of the vehicle. The graphical user interface may be positioned on an armrest, a seatback, a dashboard, and/or other suitable location.

At 232, it may be determined whether criteria has been met for sharing media to the one or more selected zones. According to an exemplary embodiment, the criteria may comprise: that the media belongs to a device from another zone that has been shared with the selected zone; and that the device that the media belongs to is not currently being used to stream media to one or more other zones.

Upon selecting one or more zones with which to share media, the media, at 234, may be made available to the one or more selected zones when the criteria has been met. According to an exemplary embodiment, when a user in a zone that has been selected by the user in the sharing zone browses their available media, and all of the criteria have been met, the additional media will be visible and available for playing.

According to an exemplary embodiment, establishing inter-zone media sharing may comprise, at 228, playing media that has been shared to a zone, as shown, e.g., in FIG. 3E.

At 236, a user in a selected zone may select, via a graphical user interface, to play a piece of media that was shared from another zone, and whose device is currently unused. At 238, a connection may be established between the sharing electronic device and the non-ultra-wideband receiver of the zone that selected the media.

At 240, the selected media may be streamed through the media playing device(s) of the zone in which the media was requested.

At 242, the user who shared the media may be notified that the media is being played. At 244, the user who shared the media is given the option to select whether or not to play the same media through the one or more media playing devices in their zone. At 246, when the user selects the option to play the same media through the one or more media playing devices in their zone, the media may then by additionally played/streamed through the media playing devices in their zone, using the multi-connect feature of the one or more media playing devices in both zones. According to an exemplary embodiment, the non-ultra-wideband receiver of either zone may be configured to play the media in both zones.

Figure 4:
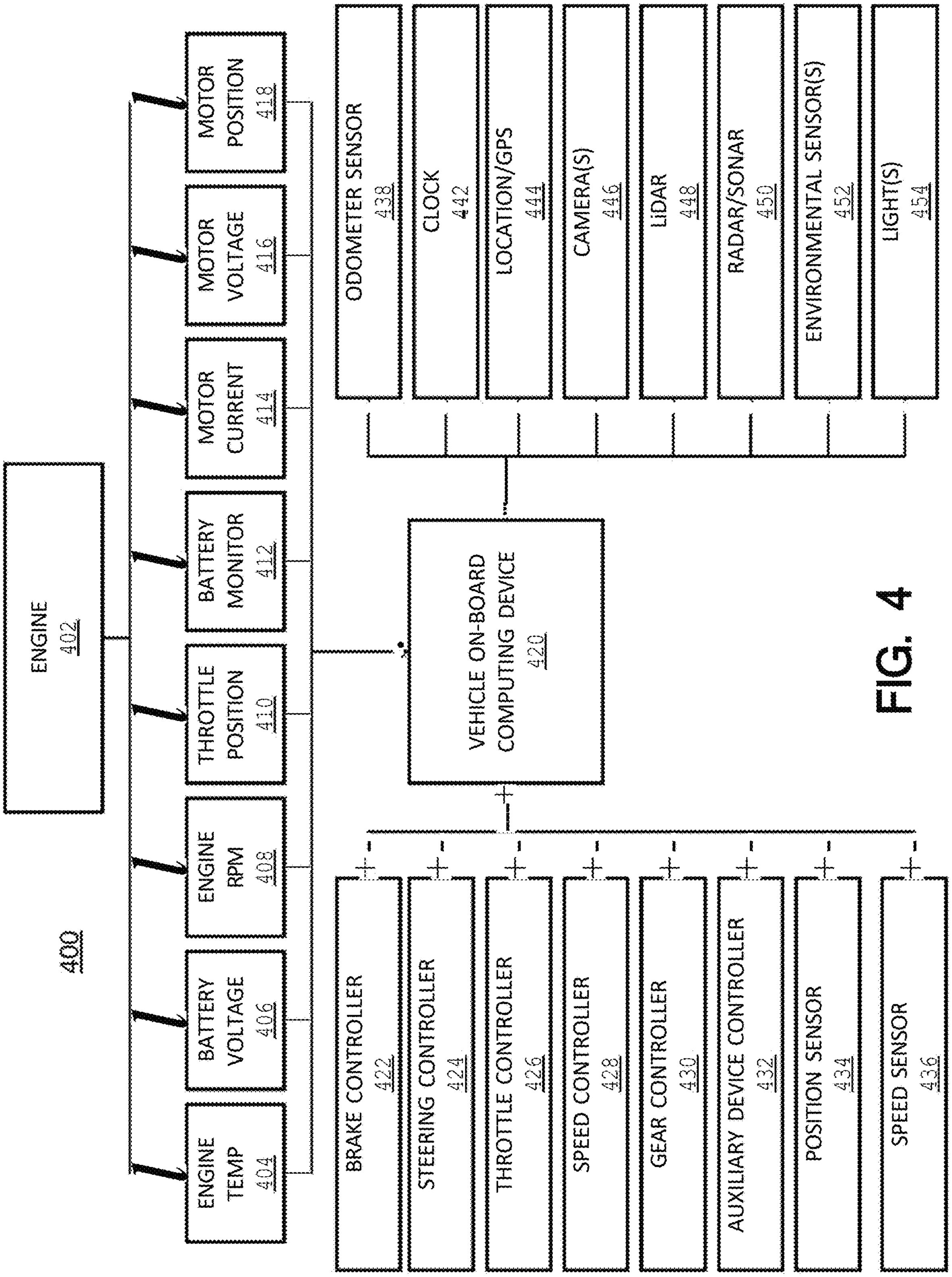
FIG. 4 illustrates an example architecture of a vehicle, according to an exemplary embodiment of the present disclosure.

Referring now to FIG. 4, an example vehicle system architecture 400 for a vehicle is provided, in accordance with an exemplary embodiment of the present disclosure. The following discussion of vehicle system architecture 400 is sufficient for understanding one or more components of vehicle 100.

As shown in FIG. 4, the vehicle system architecture 400 may comprise an engine, motor or propulsive device 402 and various sensors 404-418 for measuring various parameters of the vehicle system architecture 400. In gas-powered or hybrid vehicles having a fuel-powered engine, the sensors

404-418 may comprise, for example, an engine temperature sensor 404, a battery voltage sensor 406, an engine Rotations Per Minute (RPM) sensor 408, and/or a throttle position sensor 410. If the vehicle is an electric or hybrid vehicle, then the vehicle may comprise an electric motor, and accordingly may comprise sensors such as a battery monitoring system 412 (to measure current, voltage and/or temperature of the battery), motor current 414 and voltage 416 sensors, and motor position sensors such as resolvers and encoders 418.

Operational parameter sensors that are common to both types of vehicles may comprise, for example: a position sensor 434 such as an accelerometer, gyroscope and/or inertial measurement unit; a speed sensor 436; and/or an odometer sensor 438. The vehicle system architecture 400 also may comprise a clock 442 that the system uses to determine vehicle time and/or date during operation. The clock 442 may be encoded into the vehicle on-board computing device 420, it may be a separate device, or multiple clocks may be available.

The vehicle system architecture 400 may comprise various sensors that operate to gather information about the environment in which the vehicle is traveling. These sensors may comprise, for example: a location sensor 444 (for example, a Global Positioning System (GPS) device); object detection sensors such as one or more cameras 446; a LiDAR sensor system 448; and/or a radar and/or a sonar system 450. The sensors may comprise environmental sensors 452 such as, e.g., a humidity sensor, a precipitation sensor, a light sensor, and/or ambient temperature sensor. The object detection sensors may be configured to enable the vehicle system architecture 400 to detect objects that are within a given distance range of the vehicle in any direction, while the environmental sensors 452 may be configured to collect data about environmental conditions within the vehicle's area of travel. According to an exemplary embodiment, the vehicle system architecture 400 may comprise one or more lights 454 (e.g., headlights, flood lights, flashlights, etc.).

During operations, information may be communicated from the sensors to an on-board computing device 420 (e.g., computing device 155, computing device 500). The on-board computing device 420 may be configured to analyze the data captured by the sensors and/or data received from data providers and may be configured to optionally control operations of the vehicle system architecture 400 based on results of the analysis. For example, the on-board computing device 420 may be configured to control: braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions); and/or other controllers. The brake controller 422 may comprise a pedal effort sensor, pedal effort sensor, and/or simulator temperature sensor, as described herein.

Geographic location information may be communicated from the location sensor 444 to the on-board computing device 420, which may then access a map of the environment that corresponds to the location information to determine known fixed features of the environment such as streets, buildings, stop signs and/or stop/go signals. Captured images from the cameras 446 and/or object detection information captured from sensors such as LiDAR 448 may be communicated from those sensors to the on-board computing device 420. The object detection information and/or captured images may be processed by the on-board computing device 420 to detect objects in proximity to the vehicle. Any known or to be known technique for making an object detection based on sensor data and/or captured images may be used in the embodiments disclosed in this document.

Figure 5:
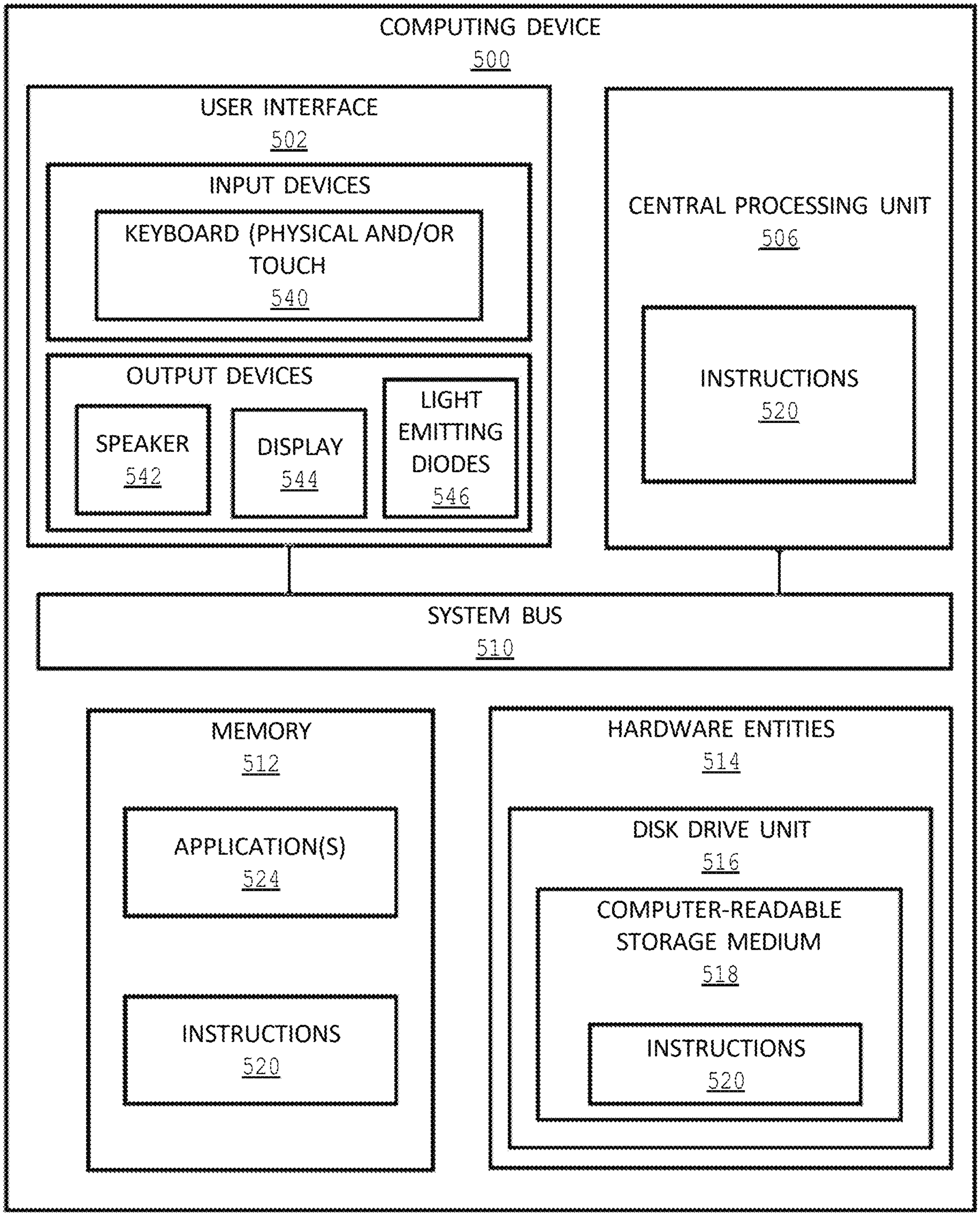
FIG. 5 illustrates example elements of a computing device, according to an exemplary embodiment of the present disclosure.

Referring now to FIG. 5, an illustration of an example architecture for a computing device 500 is provided. According to an exemplary embodiment, one or more functions of the present disclosure may be implemented by a computing device such as, e.g., computing device 500 or a computing device similar to computing device 500. Computing device 500 may be a quantum computer, a classical computer, and/or have one or more components configured to perform one or more quantum and/or classical computing functions. Computing device 155 and/or computing device 420 may be an example of computing device 500 and/or may comprise one or more components of computing device 500.

The hardware architecture of FIG. 5 represents one example implementation of a representative computing device configured to implement at least a portion of the systems/devices (e.g., vehicle 100) and method(s)/control logic(s) (e.g., method 200) described herein.

Some or all components of the computing device 500 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 5, the computing device 500 may comprise a user interface 502 (e.g., a graphical user interface), a Central Processing Unit ("CPU") 506, a system bus 510, a memory 512 connected to and accessible by other portions of computing device 500 through system bus 510, and hardware entities 514 connected to system bus 510. The user interface may comprise input devices and output devices, which may be configured to facilitate user-software interactions for controlling operations of the computing device 500. The input devices may comprise, but are not limited to, a physical and/or touch keyboard 540. The input devices may be connected to the computing device 500 via a wired or wireless connection (e.g., a Bluetooth® connection). The output devices may comprise, but are not limited to, a speaker 542, a display 544, and/or light emitting diodes 546.

At least some of the hardware entities 514 may be configured to perform actions involving access to and use of memory 512, which may be a Random Access Memory (RAM), a disk driver and/or a Compact Disc Read Only Memory (CD-ROM), among other suitable memory types. Hardware entities 514 may comprise a disk drive unit 516 comprising a computer-readable storage medium 518 on which may be stored one or more sets of instructions 520 (e.g., programming instructions such as, but not limited to, software code) configured to implement one or more of the methodologies, procedures, or functions described herein. The instructions 520 may also reside, completely or at least partially, within the memory 512 and/or within the CPU 506 during execution thereof by the computing device 500.

The memory 512 and the CPU 506 may also constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing. encoding, or carrying a set of instructions 520 for execution by the computing device 500 and that cause the computing device 500 to perform any one or more of the methodologies of the present disclosure. According to various embodiments, one or more computer applications 524 may be stored on the memory 512.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A system for providing zone-based availability for playing media, comprising:
- a vehicle comprising a cabin;
- an ultra-wideband receiver;
- a plurality of non-ultra-wideband receivers;
- a plurality of media playing devices; and
- a computing device, comprising a processor and a memory, wherein the memory is configured to store instructions that, when executed by the processor, are configured to cause the processor to:
  - establish one or more zones within the cabin of the vehicle,
    - wherein each of the one or more zones:
      - has a position and size correlating to coordinates within the cabin of the vehicle, and
      - has one or more media playing devices and one or more non-ultra-wideband receivers located therewithin and associated with a specific zone;
  - establish an ultra-wideband connection between one or more electronic devices and the ultra-wideband receiver;
  - determine, using the ultra-wideband receiver, a location of each of the one or more electronic devices;
  - assign a zone for each of the one or more electronic devices based on the location of each of the one or more electronic devices; and
  - establish a connection between each electronic device, of the one or more electronic devices, and the one or more non-ultra-wideband receivers located within its assigned zone, enabling the electronic device, via the one or more non-ultra-wideband receivers, to play media through the one or more media playing devices within its assigned zone.

2. The system of claim 1, wherein the establishing the one or more zones within the cabin of the vehicle comprises:
- determining a vehicle occupancy of the vehicle, comprising:
  - determining a number of passengers within the vehicle; and
  - determining a location of each passenger within the vehicle; and
- establishing, based on the vehicle occupancy, a number of zones, a shape of each zone, a size of each zone, and a position of each zone.

3. The system of claim 1, wherein the plurality of non-ultra-wideband receivers comprises a plurality of Bluetooth® receivers.

4. The system of claim 1, wherein:
- the computing device further comprises a graphical user interface, and
- the instructions, when executed by the processor, are further configured to cause the processor to receive a selection, by a user, to share media within an electronic device associated with a zone, with one or more zones not associated with the electronic device.

5. The system of claim 1, wherein the instructions, when executed by the processor, are further configured to cause the processor to play the shared media on the one or more media playing devices of the one or more zones not associated with the electronic device.

6. The system of claim 1, wherein the instructions, when executed by the processor, are further configured to cause the processor to play the shared media on the one or more media playing devices of the one or more zones not associated with the electronic device and the one or more media playing devices of the zone associated with the electronic device.

7. The system of claim 1, wherein the media comprises one or more of: audio media; visual media; and audio-visual media.

8. The system of claim 1, wherein the one or more media playing devices comprise one or more of: one or more speakers; and one or more displays.

9. The system of claim 1, wherein the determining the location of each of the one or more electronic devices comprises incorporating time distance of arrival and/or two-way ranging techniques.

10. The system of claim 1, wherein a number of zones, of the one or more zones, correlates to a number of seats within the cabin of the vehicle.

11. A method for providing zone-based availability for playing media, comprising:

establishing, using a computing device, one or more zones within a cabin of a vehicle, wherein:

the computing device comprises a processor and a memory; and each of the one or more zones:

has a position and size correlating to coordinates within the cabin of the vehicle, and has one or more media playing devices and one or more non-ultra-wideband receivers located therewithin and associated with a specific zone;

establishing an ultra-wideband connection between one or more electronic devices and an ultra-wideband receiver;

determining, using the ultra-wideband receiver, a location of each of the one or more electronic devices;

assigning a zone for each of the one or more electronic devices based on the location of each of the one or more electronic devices; and establishing a connection between each electronic device, of the one or more electronic devices, and the one or more non-ultra-wideband receivers located within its assigned zone, enabling the electronic device, via the one or more non-ultra-wideband receivers, to play media through the one or more media playing devices within its assigned zone.

12. The method of claim 11, wherein the establishing the one or more zones within the cabin of the vehicle comprises:

determining a vehicle occupancy of the vehicle, comprising:

determining a number of passengers within the vehicle; and determining a location of each passenger within the vehicle; and establishing, based on the vehicle occupancy, a number of zones, a shape of each zone, a size of each zone, and a position of each zone.

13. The method of claim 11, wherein the one or more of non-ultra-wideband receivers comprise a plurality of Bluetooth® receivers.

14. The method of claim 11, wherein the computing device further comprises a graphical user interface, and further comprising receiving a selection, by a user, to share media within an electronic device associated with a zone, with one or more zones not associated with the electronic device.

15. The method of claim 11, further comprising playing the shared media on the one or more media playing devices of the one or more zones not associated with the electronic device.

16. The method of claim 11, further comprising playing the shared media on the one or more media playing devices of the one or more zones not associated with the electronic device and the one or more media playing devices of the zone associated with the electronic device.

17. The method of claim 11, wherein the media comprises one or more of: audio media; visual media; and audio-visual media.

18. The method of claim 11, wherein the one or more media playing devices comprise one or more of: one or more speakers; and one or more displays.

19. The method of claim 11, wherein the determining the location of each of the one or more electronic devices comprises incorporating time distance of arrival and/or two-way ranging techniques.

20. The method of claim 11, wherein a number of zones, of the one or more zones, correlates to a number of seats within the cabin of the vehicle.

* * * * *